(12) United States Patent
Wang et al.

(10) Patent No.: US 10,909,391 B2
(45) Date of Patent: **\*Feb. 2, 2021**

(54) VEHICLE SURROUNDING INFORMATION ACQUIRING APPARATUS AND VEHICLE

(71) Applicant: HONDA MOTOR CO., LTD., Tokyo (JP)

(72) Inventors: Daihan Wang, Wako (JP); Hiroshi Miura, Wako (JP); Shintaro Fujita, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 21 days.

This patent is subject to a terminal disclaimer.

(21) Appl. No.: 16/430,496

(22) Filed: Jun. 4, 2019

(65) Prior Publication Data

US 2019/0286923 A1    Sep. 19, 2019

Related U.S. Application Data

(63) Continuation of application No. PCT/JP2017/006959, filed on Feb. 23, 2017.

(30) Foreign Application Priority Data

Dec. 6, 2016 (WO) ............... PCT/JP2016/086225
Dec. 9, 2016 (JP) ............................ 2016-239731

(51) Int. Cl.
| | | |
|---|---|---|
| *G06K 9/00* | (2006.01) | |
| *G01S 13/86* | (2006.01) | |
| *G01S 17/87* | (2020.01) | |
| *G06T 7/70* | (2017.01) | |
| *G01S 13/931* | (2020.01) | |
| *G01S 13/93* | (2020.01) | |
| *B60W 30/10* | (2006.01) | |
| *G08G 1/16* | (2006.01) | |
| *G01S 17/93* | (2020.01) | |
| *G01S 17/931* | (2020.01) | |

(52) U.S. Cl.
CPC ......... *G06K 9/00805* (2013.01); *B60W 30/10* (2013.01); *G01S 13/86* (2013.01); *G01S 13/93* (2013.01); *G01S 13/931* (2013.01); *G01S 17/87* (2013.01); *G01S 17/93* (2013.01); *G01S 17/931* (2020.01); *G06T 7/70* (2017.01); *G08G 1/16* (2013.01); *G01S 2013/9323* (2020.01); *G01S 2013/9327* (2020.01); *G06T 2207/30261* (2013.01)

(58) Field of Classification Search
CPC .......... G06K 9/00791; G06K 9/00805; G06K 2209/21; G06K 2209/23; G06T 7/50; G06T 7/521; G06T 7/55; G06T 7/70; G06T 7/97; G06T 2207/30252; G06T 2207/30261; G01S 13/86; G01S 13/867; G01S 13/93; G01S 13/931; G01S 17/86; G01S 17/87; G01S 17/93; G01S 17/931; G08G 1/16; G08G 1/165; G08G 1/166; B60W 30/08; G05D 1/0231; G05D 1/0238; G05D 1/024; G05D 1/0246; G05D 1/0248; G05D 1/0257

See application file for complete search history.

(56) References Cited

U.S. PATENT DOCUMENTS

| | | | |
|---|---|---|---|
| 7,463,184 B2 | 12/2008 | Segawa | ............................ 342/52 |
| 9,221,396 B1 | 12/2015 | Zhu et al. | ................. B60R 1/00 |
| 10,071,745 B2 | 9/2018 | Sato | ..................... B60W 50/082 |
| 2004/0178945 A1* | 9/2004 | Buchanan | .............. G01S 13/867 |
| | | | 342/70 |
| 2007/0286475 A1 | 12/2007 | Sekiguchi | ...................... 382/154 |
| 2014/0032012 A1 | 1/2014 | Joshi et al. | ........................ 701/1 |
| 2017/0018189 A1 | 1/2017 | Ishikawa | ................. G08G 1/167 |
| 2017/0082452 A1 | 3/2017 | Sumizawa | ......... G01C 21/3658 |
| 2020/0160542 A1* | 5/2020 | Kanzawa et al. | ..... G06T 3/0068 |

FOREIGN PATENT DOCUMENTS

| | | | | |
|---|---|---|---|---|
| DE | 102005008435 A1 | 8/2006 | ............. B60K 31/00 |
| GB | 2491724 A | 12/2012 | ............. G01S 17/93 |

(Continued)

OTHER PUBLICATIONS

Park Sang Soo, MONOist, Automatic Driving Technology Toyota Senior Vice President Hiroaki Okuchi: Level 4 fully automatic vehicles will be realized by developing Level 3 automatic vehicles wisely, MONOist [online], Mar. 17, 2016 (Mar. 17, 2016), (1/3), [retrieval date May 2, 2017 (May 2, 2017)], Internet: <URL:http://monoist.atmarkit.co.jp/mn/articles/1603/17/news056.html>.

(Continued)

*Primary Examiner* — Andrew W Johns
(74) *Attorney, Agent, or Firm* — Thomas | Horstemeyer, LLP (57) ABSTRACT

A vehicle surrounding information acquiring apparatus includes: a radar detector configured to detect an object around a vehicle by radio waves; a lidar detector configured to detect an object around the vehicle by light; and an image detector configured to capture a periphery of the vehicle and detect an object from the captured image. The apparatus comprises: a first processor configured to generate target information by combining a detection result of the radar detector and a detection result of the image detector; a second processor configured to generate target information by combining a detection result of the lidar detector and the detection result of the image detector; and a third processor configured to generate target information of the periphery of the vehicle by integrating the target information generated by the first processor and the target information generated by the second processor.

6 Claims, 7 Drawing Sheets

(56) References Cited

FOREIGN PATENT DOCUMENTS

| | | | | |
|---|---|---|---|---|
| JP | H07-248382 A | 9/1995 | ............. | G01S 17/93 |
| JP | H09-161196 A | 6/1997 | ............. | G08G 1/09 |
| JP | H11-212640 A | 8/1999 | ............. | G05D 1/02 |
| JP | 2000-020898 A | 1/2000 | ............. | G08G 1/16 |
| JP | 2000-172982 A | 6/2000 | ............. | G08G 1/00 |
| JP | 2001-039213 A | 2/2001 | ............. | B60Q 1/34 |
| JP | 2002-341014 A | 11/2002 | ............. | G01S 7/292 |
| JP | 2004-182161 A | 7/2004 | ............. | B60Q 1/34 |
| JP | 2004-534947 A | 11/2004 | ............. | G01S 13/93 |
| JP | 2007-310741 A | 11/2007 | ............. | G08G 1/16 |
| JP | 2008-290680 A | 12/2008 | ............. | B60W 30/00 |
| JP | 2012-106733 A | 6/2012 | ............. | B60Q 1/34 |
| JP | 2014-025925 A | 2/2014 | ............. | G01S 13/66 |
| JP | 2015-184722 A | 10/2015 | ............. | G08G 1/16 |
| JP | 2016-034782 A | 3/2016 | ............. | B60W 30/09 |
| JP | 2016-050901 A | 4/2016 | ............. | G01C 21/26 |
| WO | 2004/102222 A1 | 11/2004 | ............. | G01S 13/88 |
| WO | 2015/190212 A1 | 12/2015 | ............. | G01C 21/34 |
| WO | 2018/105135 A1 | 6/2018 | ............. | G01S 13/86 |
| WO | 2018/105136 A1 | 6/2018 | ............. | G01S 13/86 |

OTHER PUBLICATIONS

Yoshiro Tsuruhara, "Lidar" is a sensor for automatic operation to the eyes of the typhoon, Nikkei Business ONLINE [online], Aug. 18, 2016 (Aug. 18, 2016), (2/4), [retrieval date May 2, 2017 (May 2, 2017)], Internet: URL:http://business.nikkeibp.co.jp/atcl/report/15/264450/081300041/?P=2>.

Yuki Saito, MONOist, Report of lecture by Toshio Yokoyama, senior researcher in Honda on automatic driving technology: The usefulness of the driving support system creates an acceptance image for automatic driving, MONOist [online], Mar. 23, 2016 (Mar. 23, 2016), (2/3), [retrieval date May 2, 2017 (May 2, 2017)], Internet: <URL:http://monoist.atmarkit.co.jp/mn/articles/1603/23/news049 2.html>.

Yuki Saito, MONOist, Automated driving technology: Automatic confirmation of lane change safety, automatic driving on highways under development by Bosch, MONOist [online], Oct. 4, 2016 (Oct. 4, 2016), (1/3), [retrieval date May 2, 2017 (May 2, 2017)], Internet: <URL:http://monoist.atmarkit.co.jp/mn/articles/1610/04/news027.html>.

International Search Report for PCT/JP2017/006959 dated May 16, 2017 (partially translated).

International Search Report for PCT/JP2017/006957 dated May 23, 2017 (partially translated).

File history of related U.S. Appl. No. 16/430,498, filed Jun. 4, 2019.

Park Sang Soo, MONOist, The automated driving technique of Toyota is "for the safe and smooth free movement of all people", MONOist [online], Oct. 21, 2020 (Oct. 21, 2015), (3/4), [retrieval date Jun. 12, 2020 (Jun. 12, 2020)], Internet: <URL : https://monoist.atmarkit.co.jp/mn/articles/1510/21/news024_3.html>.

Aoyama, M. et al., Automated driving and telematics transform the automotive industry, New value creation NAVI Web magazine [online], Aug. 1, 2016, [retrieval date Jun. 12, 2020], Internet: <URL: https://shinkachi-portal.smrj.go.jp/webmagazine/jxm8t/>.

Author Unknown, "Toyota Safety Technical Tutorial" presenting Automated driving on highways and city roads by automated driving vehicle "Highway Teammate", Car Watch [online], Oct. 15, 2015, [retrieval date: Jun. 12, 2020], Internet: <URL: https://car.watch.impress.co.jp/docs/news/725775.html#8245_s.png>.

Final Office Action for Japanese Patent Application No. 2018-554804 dated Jul. 3, 2020. (partial translation).

* cited by examiner

VEHICLE SURROUNDING INFORMATION ACQUIRING APPARATUS AND VEHICLE

CROSS-REFERENCE TO RELATED APPLICATIONS

This application is a continuation of International Patent Application No. PCT/JP2017/006959, filed Feb. 23, 2017, which claims priority to and the benefit of International Patent Application No. PCT/JP2016/086225, filed Dec. 6, 2016, and Japanese Patent Application No. 2016-239731, filed Dec. 9, 2016, the entire disclosures of which are incorporated herein by reference.

TECHNICAL FIELD

The present invention relates to a vehicle surrounding information acquiring apparatus and a vehicle.

BACKGROUND ART

Information of the surroundings of a vehicle needs to be acquired as a premise for automated driving of the vehicle. As the arrangement of a detector for acquiring information of the surroundings of a vehicle, PTL 1 discloses a technique of acquiring information of the surroundings of a vehicle by a camera, and PTL 2 discloses a technique of acquiring information of the surroundings of a vehicle by a laser.

CITATION LIST

Patent Literature

PTL 1: Japanese Patent Laid-Open No. 2000-172982
PTL 2: Japanese Patent Laid-Open No. 7-248382

SUMMARY OF INVENTION

Technical Problem

The characteristics of the detector for acquiring information of the surroundings of a vehicle differ depending on the type of the detector. For this reason, the detector may not be able to acquire desired information under the influence of, for example, the traveling state of the vehicle, the state of surrounding road structures, and weather conditions such as rainfall, snowfall, or thick fog.

The present invention has as its object to provide a technique of acquiring information of the periphery of a vehicle precisely.

Solution to Problem

According to one aspect of the present invention, there is provided a vehicle surrounding information acquiring apparatus including: a radar detector configured to detect an object around a vehicle by radio waves; a lidar detector configured to detect an object around the vehicle by light; and an image detector configured to capture a periphery of the vehicle and detect an object from the captured image, the apparatus characterized by comprising: a first processor configured to generate target information by combining a detection result of the radar detector and a detection result of the image detector; a second processor configured to generate target information by combining a detection result of the lidar detector and the detection result of the image detector; and a third processor configured to generate target information of the periphery of the vehicle by integrating the target information generated by the first processor and the target information generated by the second processor.

Advantageous Effects of Invention

According to the present invention, information of the periphery of a vehicle can be acquired precisely.

DESCRIPTION OF EMBODIMENTS

Figure 1:
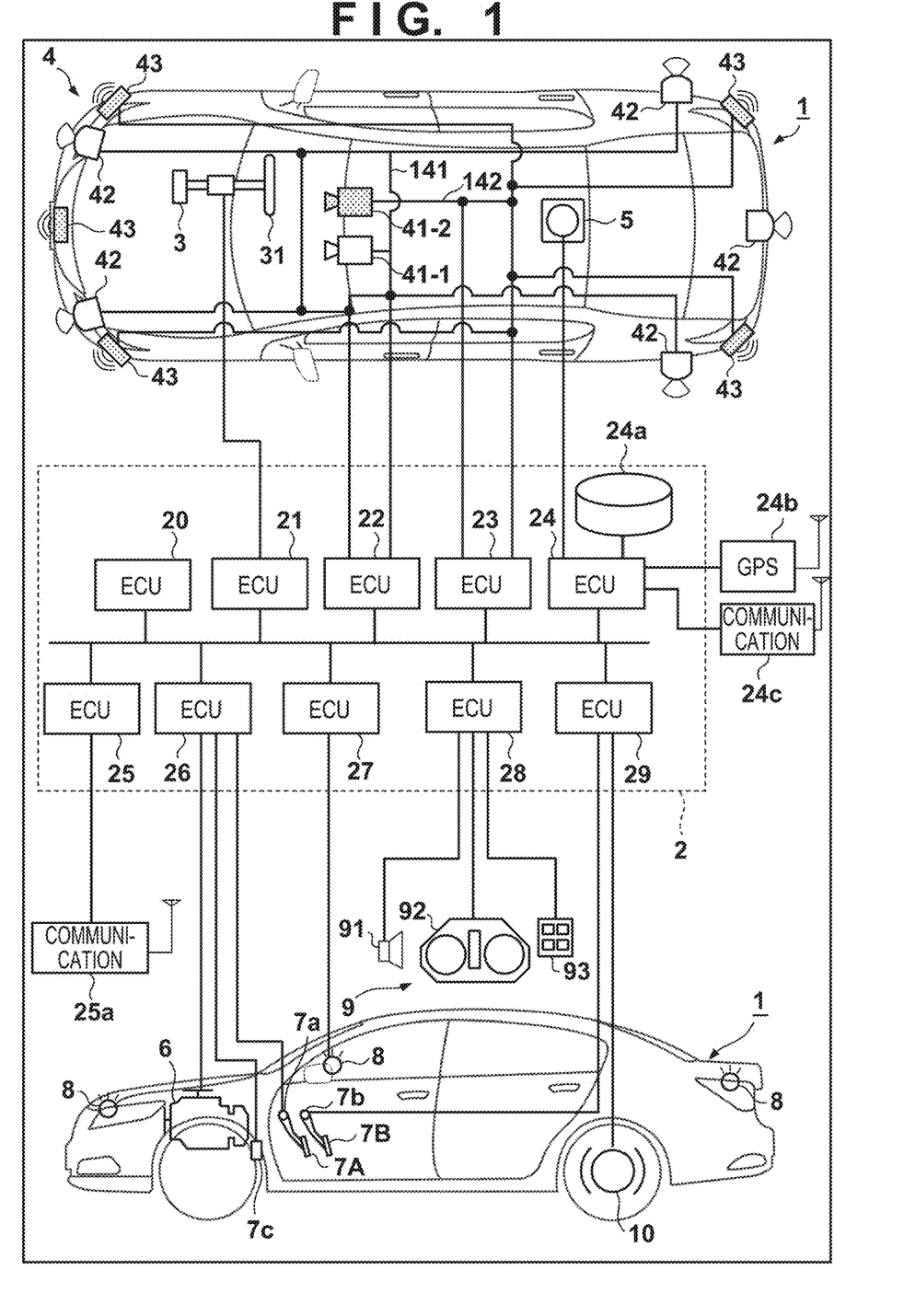
FIG. 1 is a block diagram showing a vehicle control apparatus including a vehicle surrounding information acquiring apparatus according to an embodiment.

FIG. 1 is a block diagram showing a vehicle control apparatus according to an embodiment of the present invention. The vehicle control apparatus controls a vehicle 1. In FIG. 1, an outline of the vehicle 1 is shown in a plan view and a side view. An example of the vehicle 1 is a four-wheel sedan. The vehicle control apparatus includes, as an internal component of the apparatus, a vehicle surrounding information acquiring apparatus for acquiring information of the surroundings of the vehicle 1. The vehicle surrounding information acquiring apparatus according to this embodiment acquires information of the surroundings of the vehicle 1 by using detection units (radar detectors) that detect objects around the vehicle 1 by radio waves, and detection units (lidar detectors) that detect objects around the vehicle 1 by light.

The vehicle control apparatus in FIG. 1 includes a control unit 2. The control unit 2 includes a plurality of ECUs 20 to 29 communicably connected by an in-vehicle network. Each ECU includes a processor represented by a CPU, a storage device such as a semiconductor memory, and an interface with an external device. The storage device stores programs to be executed by the processor, data to be used by the processor for processing, and the like. Each ECU may include a plurality of processors, storage devices, and interfaces.

The functions and the like provided by the ECUs 20 to 29 will be described below. Note that the number of ECUs and the provided functions can appropriately be designed for the vehicle 1, and they can be subdivided or integrated as compared to this embodiment.

The ECU 20 executes control associated with automated driving of the vehicle 1. In automated driving, at least one of steering and acceleration/deceleration of the vehicle 1 is automatically controlled. To execute the automated control, the ECU 20 generates information of the periphery of the vehicle 1 by integrating information generated by the ECU 22 and information generated by the ECU 23, which will be described later. The ECU 20 recognizes the position of the vehicle 1 on map information based on the generated information, makes an action plan about how to control the vehicle 1 based on the recognition result, and automatically controls the vehicle 1 based on the action plan.

The ECU 21 controls an electric power steering device 3. The electric power steering device 3 includes a mechanism that steers front wheels in accordance with a driving operation (steering operation) of the driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the traveling direction of the vehicle 1.

The ECUs 22 and 23 perform control of detection units 41-1, 41-2, 42, and 43 that detect the peripheral status of the vehicle and information processing of detection results. The detection units 41-1 and 41-2 are image detectors (cameras) that capture the periphery of the vehicle 1 and detect an object from the captured images. The image detectors include the first image detector 41-2 (camera) connected via a first communication line 142 to the detection units 43 (radar detectors) and the ECU 23 (first processor) arranged in the vehicle 1, and the second image detector 41-1 (camera) connected via a second communication line 141 to the detection units 42 (lidar detectors) and the ECU 22 (second processor). The image detectors are sometimes referred to as the cameras 41-1 and 41-2 hereinafter.

In this embodiment, the two cameras 41-1 and 41-2 are provided on the roof front (top of the front window) of the vehicle 1. By analyzing images captured by the cameras 41-1 and 41-2, the contour of a target around the vehicle 1 or a division line (white line or the like) of a lane on a road can be extracted. FIG. 1 shows an example in which the two cameras 41-1 and 41-2 are provided on the roof front of the vehicle 1. However, the embodiment is not limited to this example, and cameras can be arranged additionally to capture the right and left sides and back of the vehicle 1.

The detection unit 42 (lidar detector) is a lidar (laser radar) (to be sometimes referred to as the lidar 42 hereinafter), and detects a target around the vehicle 1 or measures a distance to a target by light. In this embodiment, five lidars 42 are provided; one lidar at each corner portion of the front portion of the vehicle 1, one at the center of the rear portion, and one at each side portion of the rear portion. The detection unit 43 (radar detector) is a millimeter wave radar (to be sometimes referred to as the radar 43 hereinafter), and detects a target around the vehicle 1 or measures a distance to a target by radio waves. In this embodiment, five radars 43 are provided; one at the center of the front portion of the vehicle 1, one at each corner portion of the front portion, and one at each corner portion of the rear portion.

In this embodiment, the vehicle surrounding information acquiring apparatus includes the five detection units 43 (radar detectors) and the five detection units 42 (lidar detectors), and the radar detectors and the lidar detectors in the vehicle 1 have the following relative arrangement relationship. More specifically, the detection units 43 (radar detectors) are arranged one by one at four corners of the respective corner portions of the front and rear portions of the vehicle 1 and one at the center of the front portion of the vehicle 1. The detection units 42 (lidar detectors) are arranged one by one inside the arrangement positions of the radar detectors in the vehicle width direction at the respective corner portions of the front portion of the vehicle 1, one by one outside the arrangement positions of the radar detectors in the vehicle width direction at the respective side portions of the rear portion of the vehicle 1, and one at the center of the rear portion of the vehicle 1.

Figure 2:
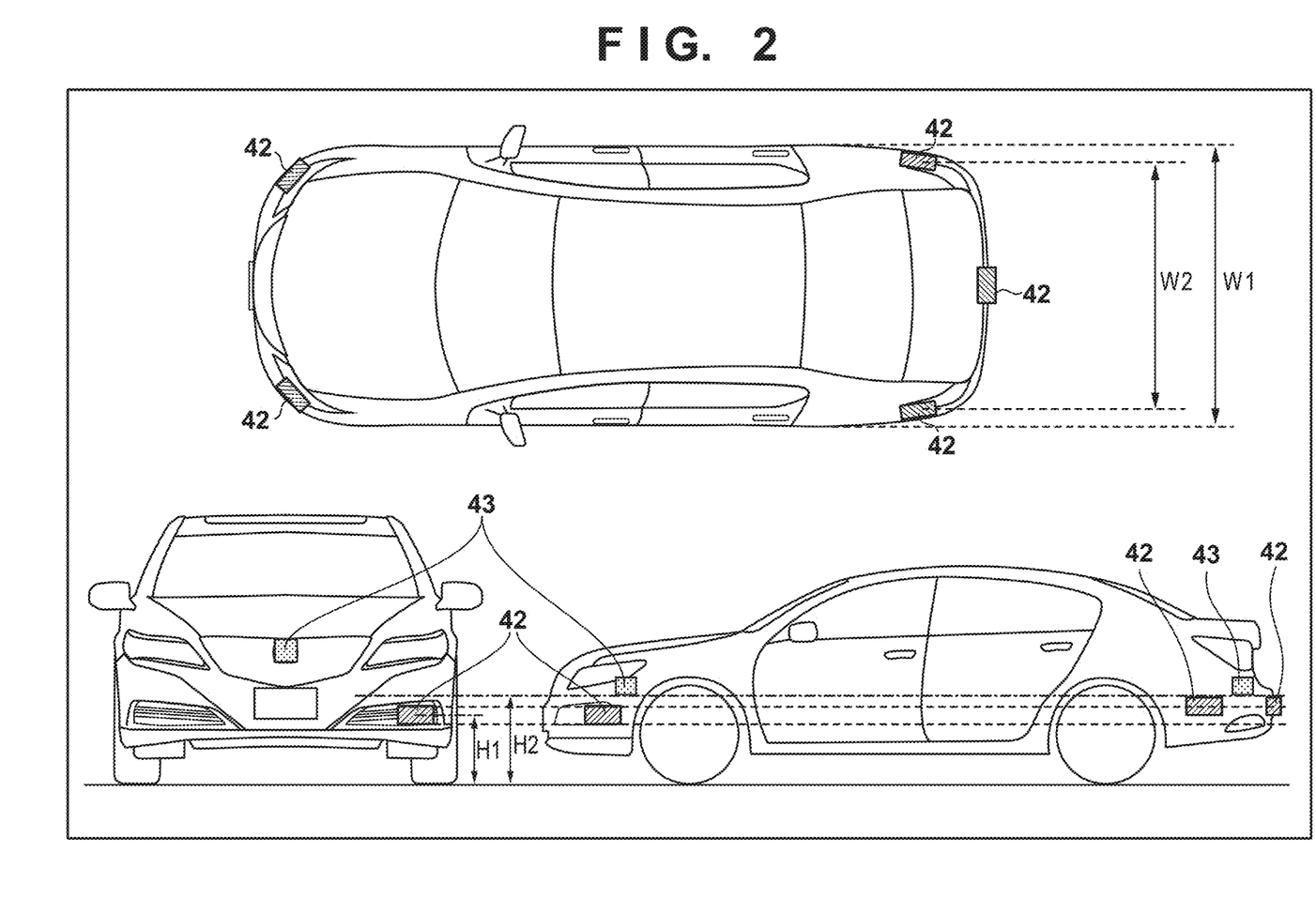
FIG. 2 is a view for explaining an example of the arrangement of lidar detectors.

FIG. 2 is a view for explaining an example of the arrangement of the detection units 42 (lidar detectors). The arrangement positions of the detection units 42 (lidar detectors) at the corner portions of the front portion of the vehicle 1 are defined as criteria. The arrangement positions of the detection units 42 (lidar detectors) at the respective side portions of the rear portion and the center of the rear portion in the static state of the vehicle 1 (empty state without any load on the vehicle 1) are set to be higher by a predetermined amount than the arrangement positions serving as the criteria. When a baggage is loaded on the vehicle 1, the displacement of the suspension tends to be larger on the rear side of the vehicle 1 than on the front side. Considering this, a difference of a predetermined amount is provided in advance at the arrangement positions of the detection units 42 (lidar detectors) in the front-and-rear direction of the vehicle 1 in the static state of the vehicle 1. Even when the displacement of the suspension on the rear side becomes larger than that on the front side owing to a live load on the vehicle 1 at the time of traveling, the respective detection units 42 (lidar detectors) can be arranged at positions of almost the same height with respect to the vehicle 1.

Since the arrangement positions of the detection units 42 (lidar detectors) are set at positions of almost the same height with respect to the vehicle 1 in consideration of a live load on the vehicle 1 at the time of traveling, correction processing on detection results based on the arrangement height can be simplified in the ECU 22. Arithmetic processing for processing detection information of the detection units 42 (lidar detectors) can be performed more quickly.

In FIG. 2, the detection unit 43 (radar detector) arranged at the center of the front portion of the vehicle 1 is arranged, for example, behind a front grille emblem, and the detection units 43 (radar detectors) arranged one by one at four corners of the respective corner portions of the front and rear portions of the vehicle 1 are arranged, for example, inside bumpers. As shown in FIG. 2, the five detection units 43 (radar detectors) are arranged above positions of at least a height H2 with respect to the vehicle 1, and the five detection units 42 (lidar detectors) are arranged at positions of a height H1 lower than the height H2. That is, the detection units 42 (lidar detectors) are arranged at positions lower than the arrangement positions of the detection units 43 (radar detectors) at the respective corner portions of the front portion of the vehicle 1, the respective side portions of the rear portion, and the center of the rear portion.

The detection units 42 (lidar detectors) are arranged at positions lower than the detection units 43 (radar detectors). For example, even if an object that does not transmit radio waves is attached to the detection units 43 (radar detectors) at four corners of the vehicle 1, a predetermined detection precision can be ensured because the arrangement positions of the detection units 43 (radar detectors) do not overlap those of the detection units 42 (lidar detectors) in the top-and-bottom direction, front-and-rear direction, and vehicle width direction of the vehicle 1.

Figure 3:
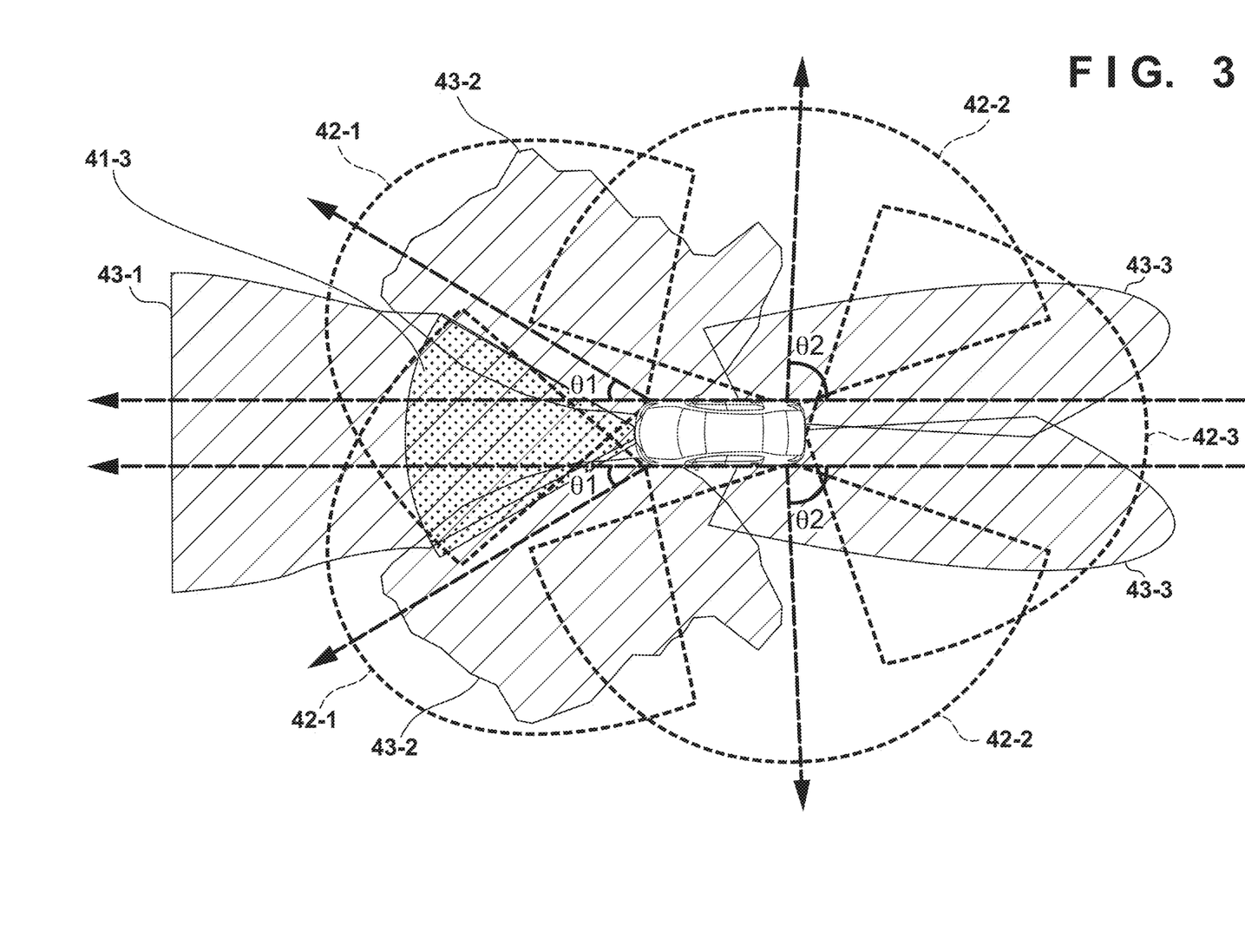
FIG. 3 is a view showing the detection ranges of the lidar detectors, radar detectors, and cameras.

FIG. 3 is a view schematically showing the detection ranges of the five detection units 42 (lidar detectors), five detection units 43 (radar detectors), and two second image detectors 41-1 and 41-2. A detection range 43-1 represents the detection range of the detection unit 43 (radar detector) arranged at the center of the front portion of the vehicle 1. Detection ranges 43-2 represent the detection ranges of the detection units 43 (radar detectors) arranged at the respective corner portions of the front portion of the vehicle 1.

Detection ranges 43-3 represent the detection ranges of the detection units 43 (radar detectors) arranged at the respective corner portions of the rear portion of the vehicle 1.

The detection ranges (detection distance characteristics) of the five detection units 43 (radar detectors) are different at the center of the front portion of the vehicle 1, the respective corner portions of the front portion, and the respective corner portions of the rear portion. The detection distance of the detection unit 43 (radar detector) arranged at the center of the front portion of the vehicle 1 among the five detection units 43 is set to be longer than those of the detection units 43 (radar detectors) arranged at four corners of the respective corner portions of the front and rear portions of the vehicle 1. Since the detection distance of the detection unit 43 (radar detector) arranged at the center of the front portion is set to be longer than those of the remaining detection units 43, a target in front of the vehicle 1 can be detected in a range of a longer distance.

In FIG. 3, detection ranges 42-1 represent the detection ranges of the detection units 42 (lidar detectors) arranged at the respective corner portions of the front portion of the vehicle 1. Detection ranges 42-2 represent the detection ranges of the detection units 42 (lidar detectors) arranged at the respective side portions of the rear portion of the vehicle 1. A detection range 42-3 represents the detection range of the detection unit 42 (lidar detector) arranged at the center of the rear portion of the vehicle 1. The detection ranges of the five detection units 42 (lidar detectors) are almost equal.

The sensor center (detection center) of each of the detection units 42 (lidar detectors) arranged at the respective corner portions of the front portion of the vehicle 1 is arranged at an angle offset by an angle θ1 with respect to the front (traveling direction of the vehicle) of the vehicle 1. The detection ranges of the detection units 42 (lidar detectors) overlap each other at the center of the front of the vehicle 1. Since the two detection units 42 are arranged so that the detection ranges of the detection units 42 (lidar detectors) at the respective corner portions of the front portion overlap each other, the detection unit 42 (lidar detector) need not be arranged at the center of the front portion of the vehicle 1 and vehicle surrounding information can be acquired by a lower-cost arrangement.

In the vehicle surrounding information acquiring apparatus according to this embodiment, one detection unit 42 (lidar detector) is arranged at the center of the rear portion of the vehicle 1. In general, heat sources such as a muffler are arranged on two sides of the rear end of a vehicle. However, at the center of the rear portion of the vehicle 1, the detection unit 42 (lidar detector) can acquire vehicle surrounding information in a state in which the influence of heat sources such as a muffler is reduced.

The detection units 42 (lidar detectors) are arranged one by one outside the arrangement positions of the radar detectors in the vehicle width direction at the respective side portions of the rear portion of the vehicle 1. The sensor center (detection center) of each of the detection units 42 (lidar detectors) arranged at the respective side portions of the rear portion of the vehicle 1 is arranged at an angle offset by an angle θ2 (>θ1) with respect to the traveling direction of the vehicle 1. The detection ranges of the detection units 42 (lidar detectors) arranged at the respective side portions of the rear portion overlap that of the detection unit 42 (lidar detector) arranged at the center of the rear portion of the vehicle 1.

As shown in the plan view of the vehicle 1 when viewed from the top in FIG. 2, the detection units 42 (lidar detectors) at the respective side portions of the rear portion of the vehicle 1 are arranged at positions (vehicle width W2 in the example shown in FIG. 2) where the vehicle width is smaller than a full width W1 of the vehicle 1 in this embodiment. The detection surfaces of the detection units 42 (lidar detectors) do not protrude from the body line of the vehicle 1 and are arranged in conformity with the body shape. By arranging the detection units 42 at the respective side portions of the rear portion in this manner, vehicle surrounding information can be acquired while protecting the detection surfaces of the detection units 42 even when, for example, an obstacle exists on the side of the vehicle 1, and ensuring wider detection ranges on the side and rear of the vehicle.

Since the detection units 42 and 43 having different detection characteristics (detection ranges) are arranged at shifted positions, information of the periphery of the vehicle 1 can be acquired by the minimum number of sensors without any dead angle. Information of the surroundings of the vehicle 1 can be acquired at a lower cost and higher precision, compared to a case in which the number of radar detectors is increased.

Note that an example of the arrangement of the detection units 42 and 43 and cameras 41-1 and 41-2 has been explained in this embodiment as for automated driving when the vehicle 1 travels ahead. In automated driving when the vehicle travels back, it is enough to reverse the arrangement of the detection units 42 and 43 and cameras 41-1 and 41-2 with respect to the arrangement example shown in FIG. 1. The arrangement of the detection units 42 and 43 and cameras 41-1 and 41-2 in the case of automated driving when the vehicle 1 travels ahead or back can be summarized as follows.

More specifically, the detection units 43 (radar detectors) are arranged one by one at four corners of the vehicle and one at the center on one side of the vehicle. The detection units 42 (lidar detectors) are arranged one by one inside the arrangement positions of the detection units 43 (radar detectors) in the vehicle width direction at the respective corner portions on one side of the vehicle, one by one outside the arrangement positions of the detection units 43 (radar detectors) in the vehicle width direction at the respective side portions on the other side of the vehicle, and one at the center on the other side of the vehicle. The respective detection units 42 (lidar detectors) are arranged at positions lower than the arrangement positions of the detection units 43 (radar detectors) at the respective corner portions on one side of the vehicle, the respective side portions on the other side, and the center on the other side. The image detectors are arranged on one side of the vehicle at the roof of the vehicle and detect an object from images capturing the surroundings of the vehicle. The detection distance of the detection unit 43 (radar detector) arranged at the center on one side of the vehicle is set to be longer than those of the detection units 43 (radar detectors) arranged at four corners of the respective corner portions of one and the other sides of the vehicle.

Referring back to FIG. 1, the ECU 23 performs control of the camera 41-2 and each radar 43 and information processing of detection results. That is, the ECU 23 (first processor) generates target information by combining the detection result of each detection unit 43 (radar detector) and the detection result of the image detector (camera 41-2).

The ECU 22 performs control of the camera 41-1 and each lidar 42 and information processing of detection results. That is, the ECU 22 (second processor) generates target information by combining the detection result of each detection unit 42 (lidar detector) and the detection result of the image detector (camera 41-1). The target information generated by the ECU 23 (first processor) and the target information generated by the ECU 22 (second processor) are input to the ECU 20 (third processor). The ECU 20 (third processor) generates target information of the periphery of the vehicle 1 by integrating the target information generated by the ECU 23 (first processor) and the target information generated by the ECU 22 (second processor). Since two sets of devices that detect the peripheral status of the vehicle are provided, the reliability of detection results can be improved. In addition, since detection units of different types such as cameras, lidars, and radars are provided, the surrounding environment of the vehicle can be analyzed from various aspects.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined from the detection result of the gyro sensor 5, the wheel speed, or the like. The GPS sensor 24b detects the current position of the vehicle 1. The communication device 24c performs wireless communication with a server that provides map information or traffic information and acquires these pieces of information. The ECU 24 can access a map information database 24a formed in the storage device. The ECU 24 searches for a route from a current position to a destination.

The ECU 25 includes a communication device 25a for inter-vehicle communication. The communication device 25a performs wireless communication with another vehicle on the periphery and performs information exchange between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8. In the example shown in FIG. 1, the direction indicators 8 are provided at the front portion, door mirrors, and rear portion of the vehicle 1.

The ECU 28 controls an input/output device 9. The input/output device 9 outputs information to the driver and accepts input of information from the driver. A voice output device 91 notifies the driver of the information by a voice. A display device 92 notifies the driver of information by displaying an image. The display device 92 is arranged on, for example, the surface of the driver's seat and constitutes an instrument panel or the like. Although a voice and display have been exemplified here, the driver may be notified of information using vibrations or light. Alternatively, the driver may be notified of information by a combination of some of the voice, display, vibrations, and light. Furthermore, the combination or the notification form may be changed in accordance with the level (for example, the degree of urgency) of information of which the driver is to be notified.

An input device 93 is a switch group that is arranged at a position where the driver can operate it and is used to input an instruction to the vehicle 1. The input device 93 may also include a voice input device.

The ECU 29 controls a brake device 10 and a parking brake (not shown). The brake device 10 is, for example, a disc brake device that is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. When the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to maintain the stop state of the vehicle 1. In addition, when the transmission of the power plant 6 includes a parking lock mechanism, it can be operated to maintain the stop state of the vehicle 1.

Figure 4:
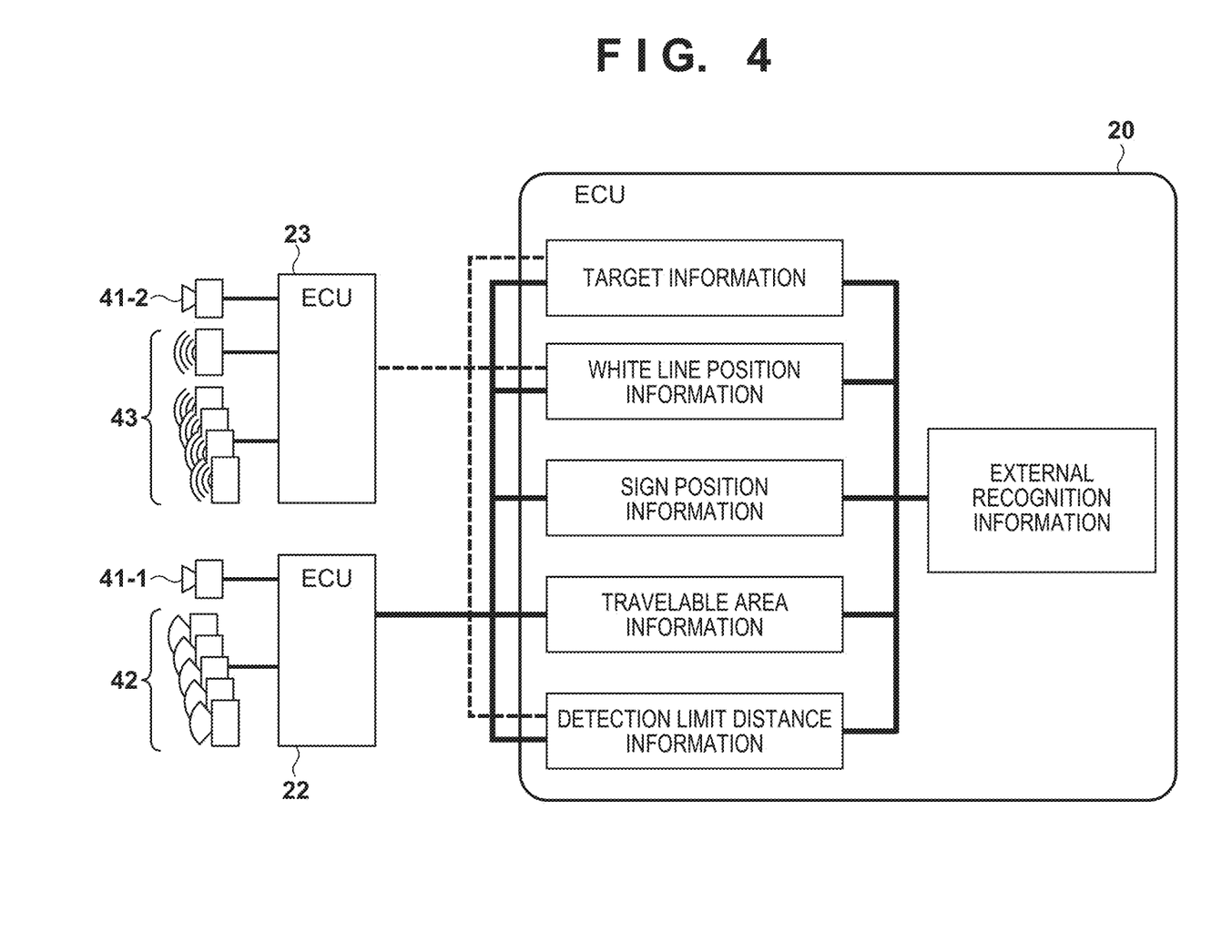
FIG. 4 is a block diagram showing processing by an ECU 20 (third processor)

FIG. 4 is a block diagram showing processing by the ECU 20 (third processor). The ECU 20 (third processor) is connected to the ECU 23 (first processor) and the ECU 22 (second processor) via communication lines and performs integration processing of pieces of target information acquired from the respective ECUs. The camera 41-2 and each radar 43 are connected to the ECU 23, and the ECU 23 (first processor) generates target information by combining the detection result of each detection unit 43 (radar detector) and the detection result of the image detector (camera 41-2).

Each detection unit 43 (radar detector) detects, for example, information of the speed of the vehicle (vehicle 1) including the detection unit 43 relative to another vehicle positioned near the vehicle 1 or extracted information of a stationary object such as an outer wall of a road, a guardrail, a white line position, or the like, and outputs the information to the ECU 23 (first processor). The camera 41-2 outputs classification information of a vehicle or a road structure present in the capturing range to the ECU 23 (first processor). The ECU 23 (first processor) generates, as target information, information obtained by integrating (combining) the information of the relative speed, extracted information of a stationary object, or the like input from each detection unit 43 (radar detector), and the classification information of a vehicle or a road structure input from the camera 41-2. Then, the ECU 23 (first processor) outputs the target information to the ECU 20 (third processor). The target information output from the ECU 23 (first processor) includes, for example, identification information of a detected object, information representing the position and speed of the detected object, classification information representing the type of the detected object, and timing information about time adjustment of the information output.

The camera 41-1 and each lidar 42 are connected to the ECU 22, and the ECU 22 (second processor) generates target information by combining the detection result of each detection unit 42 (lidar detector) and the detection result of the image detector (camera 41-1). Each detection unit 42 (lidar detector) detects, for example, information of the position, shape, speed, and the like of another vehicle positioned near the vehicle 1, and outputs it to the ECU 22 (second processor). The camera 41-1 outputs information (for example, classification, blinker/brake lamp state, and cut-in prediction) of a vehicle present in the capturing range to the ECU 22 (second processor). The ECU 22 (second processor) generates target information by integrating (combining) the information of the position, shape, speed, and the like of a vehicle input from each detection unit 42 (lidar detector) and the vehicle information input from the camera 41-1, and outputs the target information to the ECU 20 (third processor). The target information output from the ECU 22 (second processor) includes, for example, identification information of a detected object, information representing the position, shape, and speed of the detected object, classification information representing the type of the detected object, and timing information about time adjustment of the information output.

Figure 5:
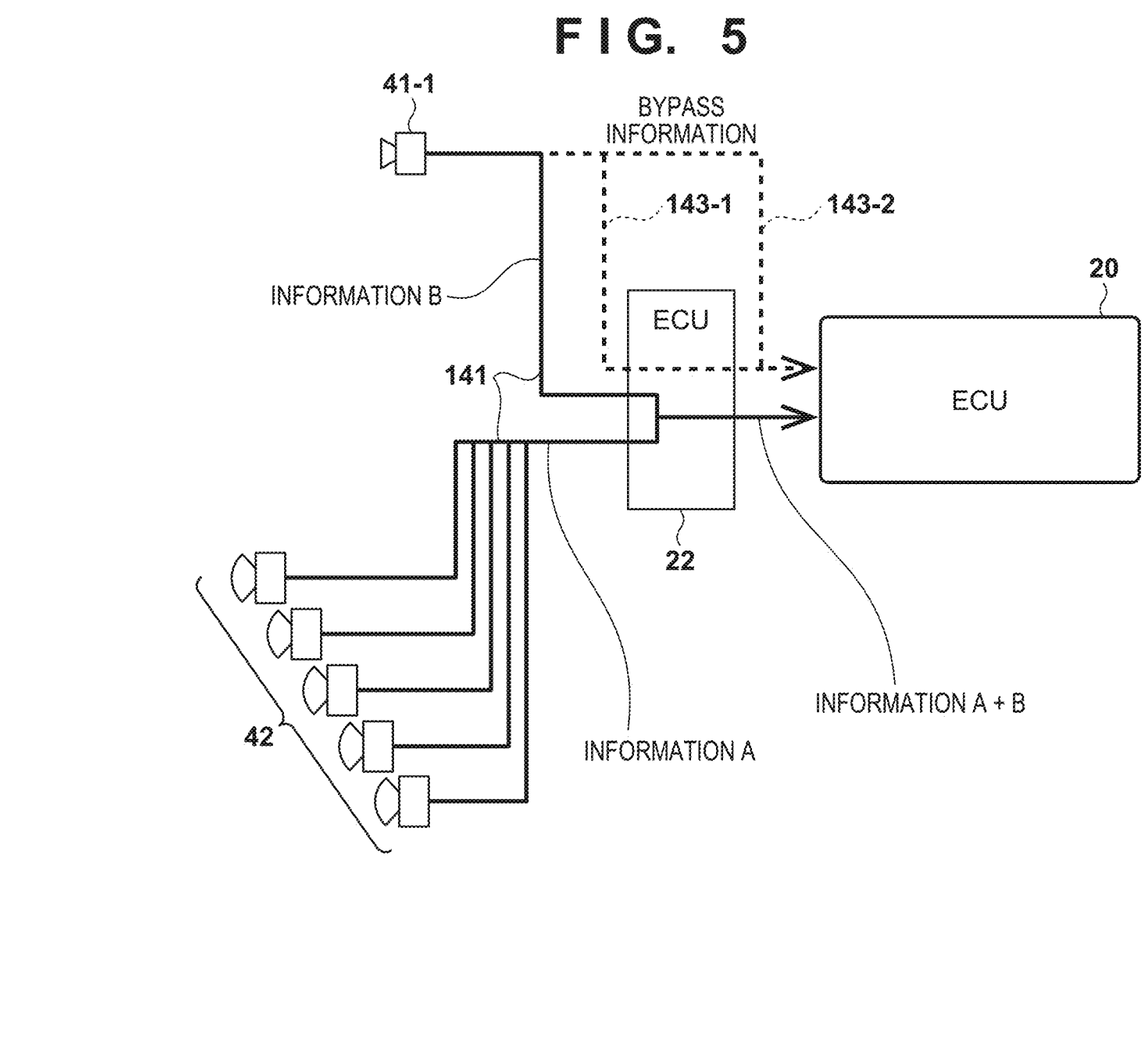
FIG. 5 is a view for explaining bypass information.

FIG. 5 is a view for explaining bypass information output from the image detector (camera 41-1). The image detector (camera 41-1) outputs, to the ECU 22 (second processor) via the second communication line 141, the vehicle information (for example, classification, blinker/brake lamp state, and cut-in prediction) subjected to information integration by the ECU 22 (second processor). The image detector (camera 41-1) outputs, as bypass information, information not subjected to integration processing in integration processing by the ECU 22 (second processor), such as information of the position of a lane or white line, the detection result of a signal/sign, the detection result of a falling object, area information (travelable area information) about a travelable free space, and the detection result of a branch/junction. As the output path of the bypass information, for example, the image detector (camera 41-1) can output the bypass information to the ECU 22 (second processor) via a third communication line (for example, 143-1).

The ECU 22 (second processor) synchronizes the transmission cycle of the target information obtained by integrating the information input from each detection unit 42 (lidar detector) and the vehicle information input from the image detector (camera 41-1) with the transmission cycle of the bypass information input from the camera 41-1, and outputs the pieces of information to the ECU 20 (third processor). Since the ECU 22 (second processor) separately acquires the vehicle information and the bypass information from the camera 41-1, the load of integration processing for generating target information can be reduced. Since the target information and the bypass information are output synchronously from the ECU 22 (second processor), the load of synchronous processing can be reduced in the ECU 20 (third processor).

The output path of bypass information is not limited to the above-described example, and the image detector (camera 41-1) can output bypass information to the ECU 20 (third processor) via, for example, a third communication line (for example, 143-2) as the output path of bypass information. In this case, information not subjected to integration processing is directly output as bypass information from the camera 41-1 to the ECU 20 (third processor). This can reduce the load of synchronous processing on the target information and the bypass information in the ECU 22 (second processor) and further speed up the integration processing in the ECU 22 (second processor).

Referring back to FIG. 4, the ECU 20 (third processor) generates target information that associates the target information generated by the ECU 23 (first processor) with the target information generated by the ECU 22 (second processor) to internally manage them. The ECU 20 (third processor) performs position correction to synchronize the pieces of target information based on timing information included in the pieces of target information input from the ECU 23 (first processor) and the ECU 22 (second processor), and integrates (generates) target information that associates the input pieces of target information to internally manage them. By this target information integration processing, the ECU 20 (third processor) generates target information of the periphery of the vehicle 1. The target information generated by the ECU 20 (third processor) includes at least one of object identification information included in the target information generated by the ECU 23 (first processor) and object identification information included in the target information generated by the ECU 22 (second processor), object identification information that associates the object identification information included in the target information generated by the first processor with the object identification information included in the target information generated by the second processor, information representing the position, shape, and speed of the associated object, and classification information representing the type of the associated object.

The ECU 20 (third processor) manages the generated target information in an internal buffer. For example, newly detected and generated target information is registered in the internal buffer. As for already registered target information, a change of the target information is checked and the state estimation and track of the target information are performed. For example, even if a target is hidden by another vehicle and cannot be detected temporally, the state estimation and track of the undetected target can be performed based on the target information managed in the internal buffer. Over-detection information can be removed by a multiple use of detection results from three different types of detection units, that is, cameras, lidar detectors, and radar detectors, as in the arrangement according to this embodiment. For example, even if a target is detected as an obstacle on a road in detection by a given detection unit, but it is not an obstacle as a result of totally analyzing detection results from three types of detection units, the ECU 20 (third processor) can remove corresponding target information as the over-detected obstacle by executing obstacle removal logic. This can improve the information processing efficiency and information of the periphery of a vehicle can be acquired precisely.

The ECU 20 (third processor) can compare pieces of information redundantly output from the ECU 23 (first processor) and the ECU 22 (second processor) with each other, and determine the presence/absence of an abnormality in the detection result. For example, when pieces of information output from the ECU 23 (first processor) and the ECU 22 (second processor) include contradictory information, the ECU 20 (third processor) determines a preferential ECU in accordance with detection items.

For example, as for detection items concerning the position and shape, the detection characteristics of the detection unit 42 (lidar detector) are superior to those of the detection unit 43 (radar detector), so the ECU 20 (third processor) performs adjustment to give priority to the detection result of the ECU 22 (second processor). As for detection items concerning the speed, the detection characteristics of the detection unit 43 (radar detector) are superior to those of the detection unit 42 (lidar detector), so the ECU 20 (third processor) performs adjustment to give priority to the detection result of the ECU 23 (first processor).

The ECU 20 (third processor) generates, as target information, information including the position, shape, speed, and classification result concerning vehicle information by integration processing based on camera information and the detection results of each detection unit 42 (lidar detector)

and each detection unit 43 (radar detector). In addition, the ECU 20 (third processor) acquires white line position information representing the position of a white line on a road, sign position information representing a sign position on a road, travelable area information representing an area where the vehicle 1 can travel, and detection limit distance information as a performance limit detectable by the detection units 41-1, 41-2, 42, and 43 based on pieces of information from the ECU 23 (first processor) and the ECU 22 (second processor).

Figure 6:
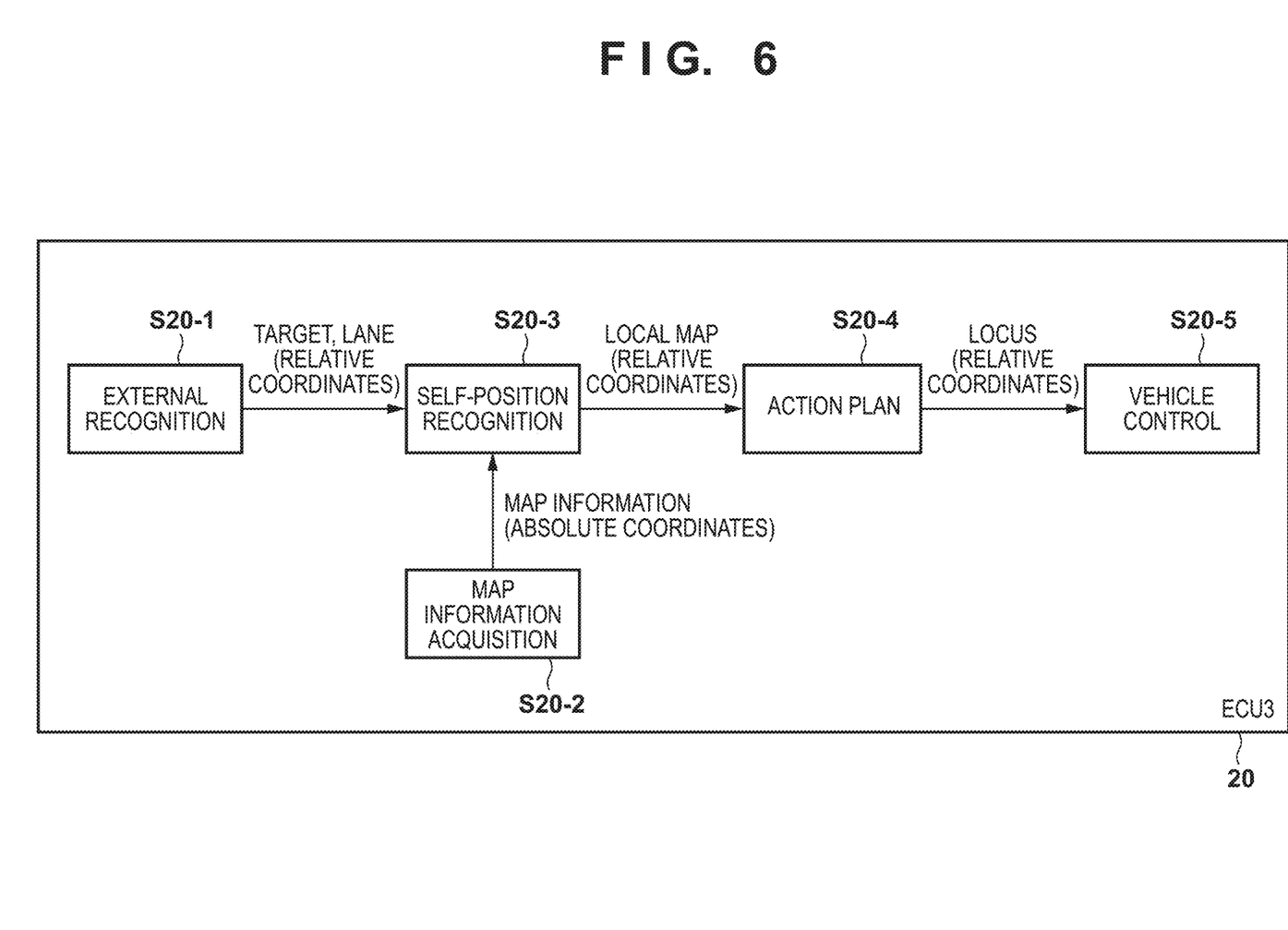
FIG. 6 is a block diagram showing the procedure of processing in the ECU 20 (third processor)

FIG. 6 is a block diagram showing the procedure of processing in the ECU 20 (third processor). In S20-1, the ECU 20 (third processor) acquires external recognition information representing the relative position relationship between the vehicle 1 and the periphery of the vehicle by using target information generated based on integration processing, white line position information, sign position information, travelable area information, and detection limit distance information.

In S20-2, the ECU 20 (third processor) functions as a map information acquiring unit (MPU: Map Positioning Unit) and acquires map information in the absolute coordinate system. For example, the ECU 20 (third processor) can acquire map information in the absolute coordinate system at a predetermined timing via the GPS sensor 24b and the communication device 24c.

Figure 7:
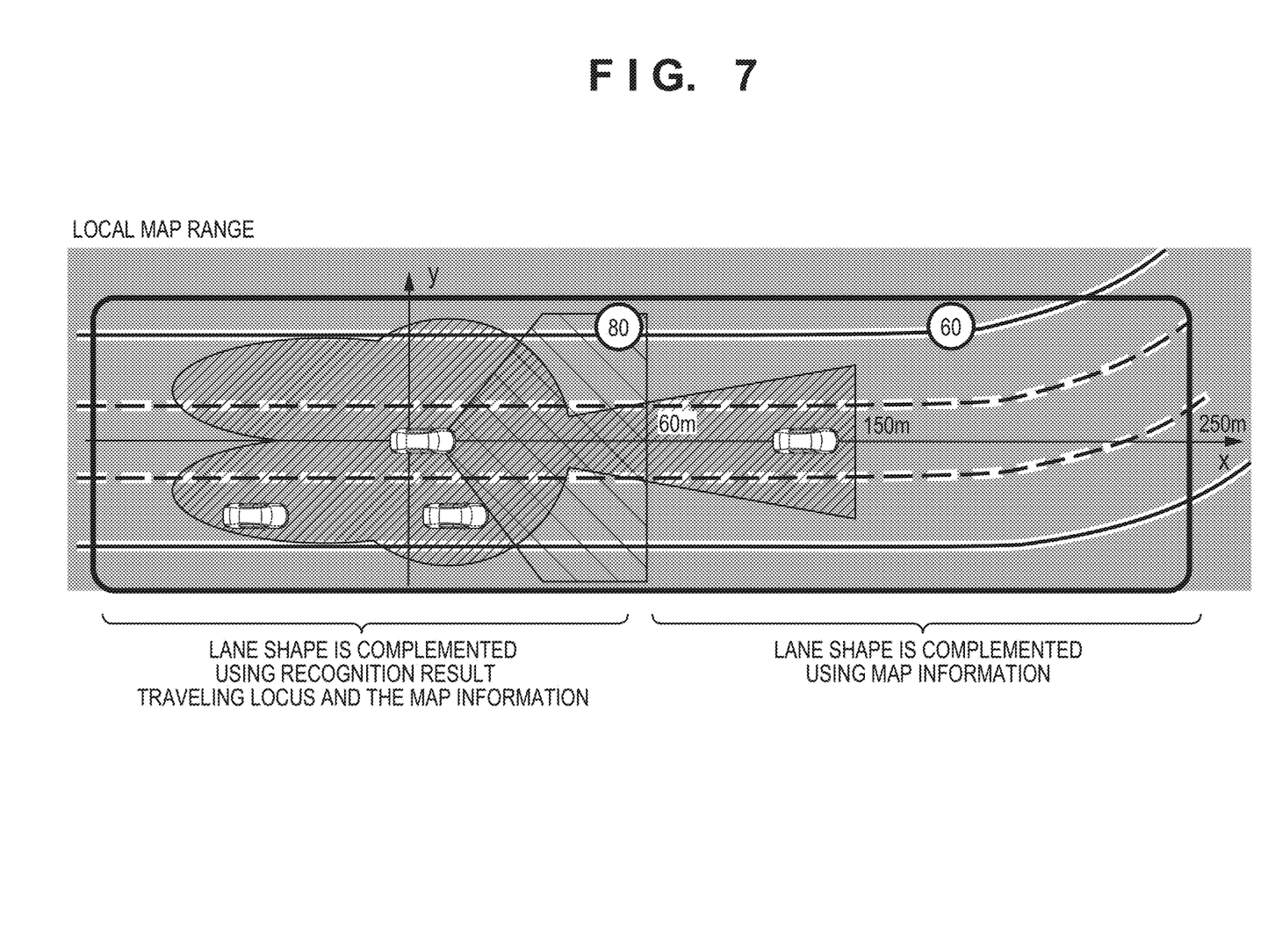
FIG. 7 is a view exemplifying a local map.

In S20-3, the ECU 20 (third processor) performs recognition processing of a self-position on the map based on the map information in the absolute coordinate system and the external recognition information in the relative coordinate system, and outputs a local map that is a combination of the map information and the external recognition information. FIG. 7 is a view exemplifying the local map. The local map represents the relative position relationship between the vehicle and other peripheral vehicles, and the lane shape is complemented using the recognition results of the position of a white line, a sign, and the like, the traveling locus, and the map information. The ECU 20 (third processor) generates an action plan based on the information on the local map (S20-4). The action plan defines the traveling direction, speed, position, and the like of the vehicle 1 to implement automated driving. The ECU 20 (third processor) performs vehicle control based on the generated action plan. That is, the ECU 20 (third processor) performs driving control, braking control, or steering control to control the vehicle 1 on a predetermined locus (S20-5). When the driver instructs the ECU 20 (third processor) about a destination and automated driving, the ECU 20 (third processor) automatically controls the traveling of the vehicle 1 toward the destination in accordance with a guidance route found by the ECU 24. At the time of automated control, the ECU 20 (third processor) acquires pieces of information about the peripheral status of the vehicle 1 from the ECU 23 (first processor) and the ECU 22 (second processor), and instructs the ECUs 21, 26, and 29 based on the acquired pieces of information to control the steering and acceleration/deceleration of the vehicle 1. If no predetermined detection result is obtained from an output from either of the ECU 23 (first processor) and the ECU 22 (second processor), the ECU 20 (third processor) can notify the driver to return the vehicle 1 from the automated driving control state to a driving operation by the driver. If a response of the driver to the notification is not obtained, the ECU 20 (third processor) can perform alternate control to stop or decelerate the vehicle.

SUMMARY OF EMBODIMENT

1. The vehicle surrounding information acquiring apparatus according to this embodiment including:
a radar detector (for example, 43) configured to detect an object around a vehicle by radio waves;
a lidar detector (for example, 42) configured to detect an object around the vehicle by light; and
image detectors (for example, 41-1, 41-2) configured to capture a periphery of the vehicle and detect an object from the captured image, is characterized by comprising:
a first processor (for example, 23) configured to generate target information by combining a detection result of the radar detector and a detection result of the image detector;
a second processor (for example, 22) configured to generate target information by combining a detection result of the lidar detector and the detection result of the image detector; and a third processor (for example, 20) configured to generate target information of the periphery of the vehicle by integrating the target information generated by the first processor and the target information generated by the second processor.

According to this embodiment, information of the periphery of a vehicle can be acquired precisely. Over-detection information can be removed by a multiple use of detection results from three types of detection units. This can improve the information processing efficiency and information of the periphery of a vehicle can be acquired precisely.

2. The vehicle surrounding information acquiring apparatus according to this embodiment is characterized in that the target information generated by the first processor (for example, 23) includes identification information of a detected object, information representing a position and speed of the detected object, classification information representing a type of the detected object, and timing information about time adjustment of an information output, the target information generated by the second processor (for example, 22) includes identification information of a detected object, information representing a position, shape, and speed of the detected object, classification information representing a type of the detected object, and timing information about time adjustment of an information output, and the third processor (for example, 20) generates the target information that associates the target information generated by the first processor (for example, 23) with the target information generated by the second processor (for example, 22) to internally manage the target information generated by the first processor and the target information generated by the second processor.

According to this embodiment, information of the periphery of a vehicle can be acquired precisely. Over-detection information can be removed by a multiple use of detection results from three types of detection units. This can improve the information processing efficiency and information of the periphery of a vehicle can be acquired precisely.

3. The vehicle surrounding information acquiring apparatus according to this embodiment is characterized in that the target information generated by the third processor (for example, 20) includes at least one information out of
object identification information included in the target information generated by the first processor (for example, 23) and the second processor (for example, 22),
object identification information that associates the object identification information included in the target information generated by the first processor (for example, 23) with the object identification information included in the target information generated by the second processor (for example, 22),
information representing a position, shape, and speed of the associated object, and classification information representing a type of the associated object.

According to this embodiment, information of the periphery of a vehicle can be acquired precisely. Over-detection information can be removed by a multiple use of detection results from three types of detection units. This can improve the information processing efficiency and information of the periphery of a vehicle can be acquired precisely.

4. The vehicle surrounding information acquiring apparatus according to this embodiment is characterized in that the image detector includes:
a first image detector (for example, 41-2) connected via a first communication line to the radar detector and the first processor arranged in the vehicle; and
a second image detector (for example, 41-1) connected via a second communication line to the lidar detector and the second processor arranged in the vehicle.

According to this embodiment, information of the periphery of a vehicle can be acquired precisely.

5. The vehicle surrounding information acquiring apparatus according to this embodiment is characterized in that the second image detector (for example, 41-1) of the image detector directly outputs part of a detection result as bypass information to the third processor (for example, 20) via a third communication line (for example, 143).

According to this embodiment, information not subjected to integration processing is directly output as bypass information to the ECU 20 (third processor). This can reduce the load of processing in the ECU 22 (second processor) and further speed up the integration processing.

6. A vehicle (for example, 1) according to this embodiment is characterized by comprising the vehicle surrounding information acquiring apparatus according to this embodiment. This embodiment can provide a vehicle that reflects, in automated driving, surrounding information of the vehicle acquired by the vehicle surrounding information acquiring apparatus.

The present invention is not limited to the above-described embodiment, and various changes and modifications can be made within the spirit and scope of the present invention. Therefore, to apprise the public of the scope of the present invention, the following claims are made.

The invention claimed is:

1. A vehicle surrounding information acquiring apparatus including:
a radar detector configured to detect an object around a vehicle by radio waves;
a lidar detector configured to detect an object around the vehicle by light; and
an image detector configured to capture a periphery of the vehicle and detect an object from the captured image, the apparatus comprising:
a first processor configured to generate target information by combining a detection result of the radar detector and a detection result of the image detector;
a second processor configured to generate target information by combining a detection result of the lidar detector and the detection result of the image detector; and
a third processor configured to generate target information of the periphery of the vehicle by integrating the target information generated by the first processor and the target information generated by the second processor.

2. The vehicle surrounding information acquiring apparatus according to claim 1, wherein the target information generated by the first processor includes identification information of a detected object, information representing a position and speed of the detected object, classification information representing a type of the detected object, and timing information about time adjustment of an information output,
the target information generated by the second processor includes identification information of a detected object, information representing a position, shape, and speed of the detected object, classification information representing a type of the detected object, and timing information about time adjustment of an information output, and
the third processor generates the target information that associates the target information generated by the first processor with the target information generated by the second processor to internally manage the target information generated by the first processor and the target information generated by the second processor.

3. The vehicle surrounding information acquiring apparatus according to claim 2, wherein the target information generated by the third processor includes at least one information out of
object identification information included in the target information generated by the first processor and object identification information included in the target information generated by the second processor,
object identification information that associates the object identification information included in the target information generated by the first processor with the object identification information included in the target information generated by the second processor,
information representing a position, shape, and speed of the associated object, and
classification information representing a type of the associated object.

4. The vehicle surrounding information acquiring apparatus according to claim 1, wherein the image detector includes:
a first image detector connected via a first communication line to the radar detector and the first processor arranged in the vehicle; and
a second image detector connected via a second communication line to the lidar detector and the second processor arranged in the vehicle.

5. The vehicle surrounding information acquiring apparatus according to claim 4, wherein the second image detector of the image detector directly outputs part of a detection result as bypass information to the third processor via a third communication line.

6. A vehicle comprising a vehicle surrounding information acquiring apparatus defined by claim 1.

* * * * *